United States Patent [19]
Burns et al.

[11] Patent Number: 5,482,297
[45] Date of Patent: Jan. 9, 1996

[54] SEAL ELEMENT FOR INSTALLATION IN AN ANNULAR DOVE-TAIL GROOVE

[75] Inventors: James W. Burns, Harleysville, Pa.; John A. Burke, Rocky River, Ohio

[73] Assignee: Greene, Tweed of Delaware, Inc., Wilmington, Del.

[21] Appl. No.: 369,941

[22] Filed: Jan. 9, 1995

[51] Int. Cl.$^6$ ........................................................ F16J 9/20
[52] U.S. Cl. ............................................. 277/169; 277/171
[58] Field of Search .................................... 277/169, 170, 277/171, 208, 209, 210, 206 A

[56] References Cited

U.S. PATENT DOCUMENTS

| | | | |
|---|---|---|---|
| 2,690,360 | 9/1954 | Young | 277/169 |
| 3,575,431 | 4/1971 | Bryant | 277/171 |
| 4,192,520 | 3/1980 | Hasegawa | 277/171 |
| 4,828,274 | 5/1989 | Stannard | 277/171 |

FOREIGN PATENT DOCUMENTS

| | | | |
|---|---|---|---|
| 655856 | 4/1979 | U.S.S.R. | 277/170 |
| 1672054 | 8/1991 | U.S.S.R. | 277/169 |

*Primary Examiner*—William A. Cuchlinski, Jr.
*Assistant Examiner*—Scott W. Cummings
*Attorney, Agent, or Firm*—Panitch Schwarze Jacobs & Nadel

[57] ABSTRACT

A seal element for installation in an annular groove is disclosed. The groove has a mouth, first and second side walls, and a base wall axially extending between the side walls. The side walls extend toward each other as each side wall respectively approaches the mouth to form a dove-tail shape in toroidal cross-section. Within the groove, the first side wall meets the base wall at a generally inwardly rounded surface. The seal element is annularly shaped and has an external seal surface that in toroidal cross-section includes first and second arcual portions and a pair of flashing points. The first arcual portion contacts the side walls and the base wall and partially protrudes through the mouth of the groove. The second arcual portion is complementarily received by a portion of the inwardly rounded surface of the groove. The pair of mold flashing points are oppositely situated on the external seal surface, and each flashing point is positioned on a part of the external seal surface located away from a sealed fluid.

8 Claims, 1 Drawing Sheet

SEAL ELEMENT FOR INSTALLATION IN AN ANNULAR DOVE-TAIL GROOVE

BACKGROUND OF THE INVENTION

The present invention relates generally to annular seal assemblies for effecting a seal between relatively movable parts. More particularly, the present invention relates to a seal element for an annular dove-tail groove that positions the mold flashing or parting lines on the seal element away from a sealed fluid, and that prevents unwanted toroidal rotation of the seal element.

Providing a seal between adjacent annular surfaces such as a piston and a surrounding cylinder and a plugging member and a surrounding housing is generally well known in the art. Such a seal is usually accomplished by employing a seal element formed from a relatively resilient, deformable sealing material, such as synthetic or natural rubber. The seal element is generally annular and often is generally circularly shaped in toroidal cross-section. The seal element is usually positioned in an annular groove or gland on either the central member or the surrounding member.

For certain applications, it is known to employ a groove that has a dove-tail shape in toroidal cross-section. As seen in FIGS. 1–3, such a dove-tail groove 10 typically has an opening or mouth 12, first and second side walls 14, 16, and an axial base wall 18 that extends between the side walls 14, 16. The dove-tail shape of the groove 10 is obtained by having the side walls 14, 16 extend toward each other as each side wall 14, 16, respectively, approaches the mouth 12 of the groove 10. Thus, each side wall 14, 16, is at an angle of less than 90 degrees with respect to the base wall 18. Also typically, at least one of the side walls 14, 16 meets the base wall 18 at a generally inwardly rounded surface 19.

It is well known to employ a seal element having a generally circular toroidal cross-section in connection with the dove-tail groove 10. Such a prior art seal element 20 is shown in FIG. 1, and is usually formed in a molding process. Accordingly, the prior art seal element 20 generally has a pair of mold flashing or parting points 22a, 22b generally oppositely situated on the surface 24 thereof at the point where the two halves of the mold met. Due to the nature of the molding process, one of the mold flashing points 22a naturally resides on a part of the surface 24 external to the groove 10 and in direct contact with a sealed fluid (not shown in FIG. 1).

While the prior art seal element 20 seen in FIG. 1 may be constructed and dimensioned to provided effective sealing, certain sealed fluids have been known to degrade the prior art seal element 20 at the points 22a, 22b and cause the prior art seal element 20 to fail. Such sealed fluids include several different plasmas (combinations of processing gases) employed in semiconductor processing applications, for example.

Further, due to the generally circular toroidal cross-section of the prior art seal element 20, the installation and operation of the prior art seal element 20 can result in toroidal rotational movement thereof. Such toroidal rotational movement causes improper seating of and unwanted internal stress within the prior art seal element 20. As a result, the toroidal rotational movement causes undue wear and failure of the prior art seal element 20.

The present invention comprises a seal element for installation in an annular dove-tail-shaped groove in which the seal element is positioned to avoid contact between mold flashing points thereon and a sealed fluid. Additionally, the seal element of the present invention has a toroidal cross-sectional shape that prevents toroidal rotational movement during installation and operation.

SUMMARY OF THE INVENTION

Briefly stated, the present invention comprises a seal element for installation in an annular groove. The groove has a mouth, first and second side walls, and a base wall axially extending between the side walls. To form a dove-tail shape in toroidal cross-section, the side walls extend toward each other as each side wall respectively approaches the mouth. Within the groove, the first side wall meets the base wall at a generally inwardly rounded surface.

The seal element is an annularly shaped element formed of an elastomeric material and has an external surface that in toroidal cross-section includes first and second arcual portions and a pair of flashing points. The first arcual portion has a first radius and a first radial center, where the first radius is sized to allow the first arcual portion to contact the side walls and the base wall and to partially protrude through the mouth of the groove. The second arcual portion has a second radius smaller than the first radius and a second radial center, where the second radius is sized and the second radial center is offset from the first radial center to allow the second arcual portion to be complementarily received by a portion of the inwardly rounded surface of the groove. The pair of mold flashing points are oppositely situated on the surface, and each flashing point is positioned on a part of the external seal surface located away from contact with a sealed fluid.

BRIEF DESCRIPTION OF THE DRAWINGS

The foregoing summary, as well as the following detailed description of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF PREFERRED EMBODIMENTS

Figure 1:
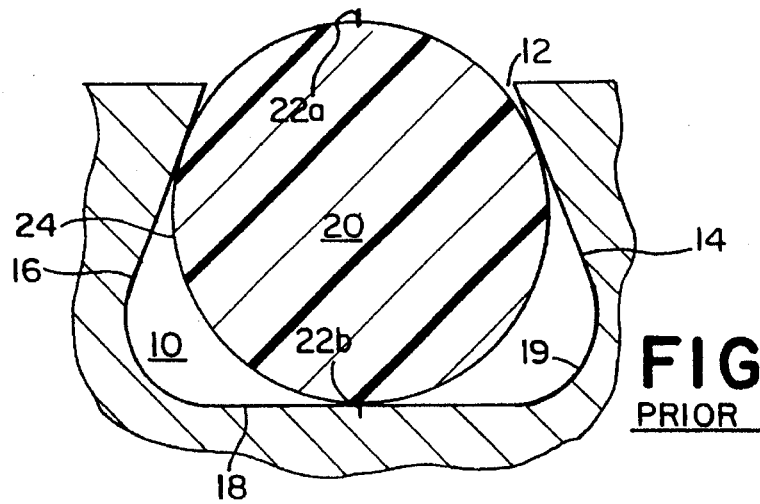
FIG. 1 is a toroidal cross-sectional view of a prior art seal element positioned in an annular dove-tail groove.

Certain terminology may be used in the following description for convenience only and is not limiting. The words "left", "right", "upper" and "lower" designate directions in the drawings to which reference is made. The words "inwardly" and "outwardly" are further directions toward and away from, respectively, the geometric center of the referenced element. The terminology includes the words above specifically mentioned, derivatives thereof, and words of similar import.

Figure 2:
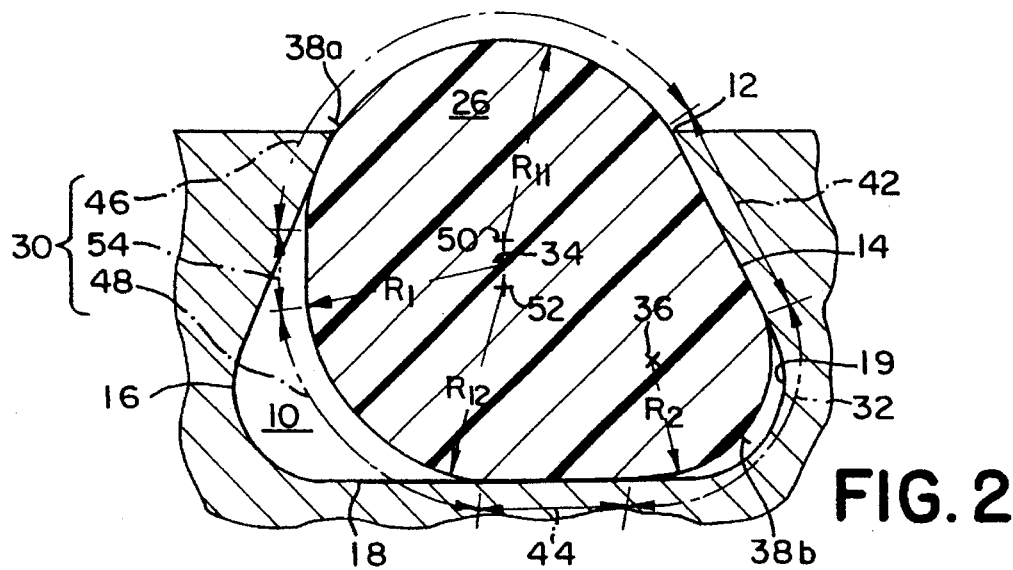
FIG. 2 is a toroidal cross-sectional view of a seal element of the present invention positioned within the dove-tail groove, where the seal element has a lobe extending toward a corner of the groove.

Referring to the drawings in detail, wherein like numerals are used to indicate like elements throughout, there is shown in FIG. 2 a seal element 26 constructed in accordance with a preferred embodiment of the present invention. As should be understood, the seal element 26 is annularly shaped and is formed from an elastomeric material. Preferably, the elastomeric material comprises a perfluoro-elastomeric or a fluoro-elastomeric material, although it will be recognize that other materials may be employed without departing from the spirit and scope of the present invention.

In toroidal cross-section and as seen in FIG. 2, the external seal surface 28 of the seal element 26 has first and second generally arcual portions 30, 32. The first generally arcual portion 30 has a first mean radius $R_1$ extending from the surface to a first radial center 34, and the first radial center 34 is situated approximately in the center of the groove 10 when the seal element 26 is positioned in the groove 10. Preferably, the first mean radius $R_1$ is sized such that the first arcual portion 30 contacts the side walls 14, 16 and the base wall 18 of the groove 10, and such that the first arcual portion 30 protrudes through the mouth 12 of the groove 10.

The second generally arcual portion 32 has a second mean radius $R_2$ smaller than the first mean radius $R_1$ and extending to a second radial center 36. Preferably, the second radial center 36 is offset from the first radial center 34 toward the inwardly rounded surface 19 of the groove 10 when the seal element 26 is positioned in the groove 10. Also preferably, the second mean radius $R_2$ is sized such that the second arcual portion 32 is complementarily received by at least a portion of the inwardly rounded surface 19. Thus, the second arcual portion 32 outlines a lobe of the seal element 26 extending toward a corner of the groove 10.

Similar to the prior art seal element 20 shown in FIG. 1, the seal element is formed by a molding process which often results in the creation of a pair of mold flashing or parting points 38a, 38b. As seen, points 38a, 38b are generally oppositely situation on the surface 28 of the seal element 26. Because of the unique shape of the seal element 20, it is preferable that the flashing point 38a be positioned on the first arcual portion 30 and that the flashing point 38bbe positioned on the second arcual portion 32. Also preferably, and as may be seen in FIG. 2, the flashing points 38a, 38band the first and second radial centers 34, 36 are all positioned in a relatively straight line.

Figure 3:
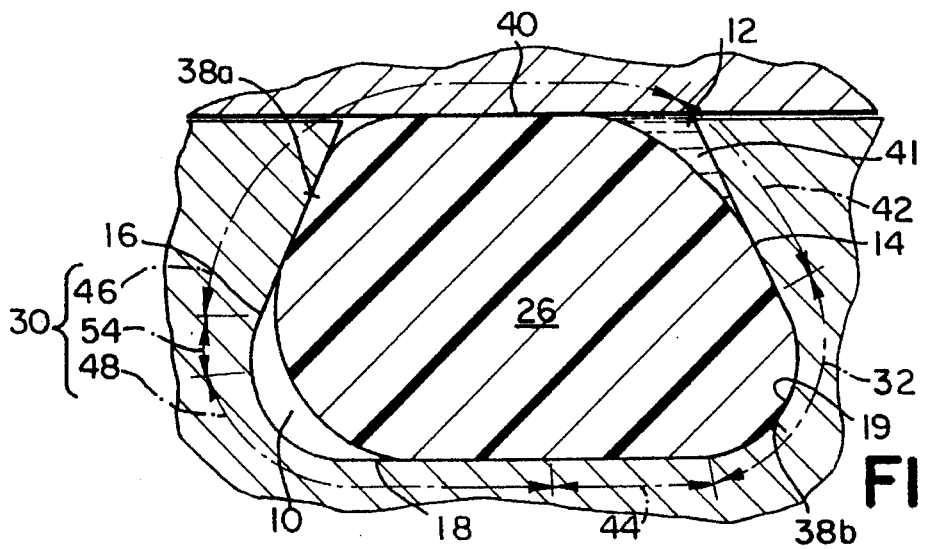
FIG. 3 is a toroidal cross-sectional view of the seal element of FIG. 2 compressed by a surface extending across the mouth of the groove.

In contrast with the prior art seal element 20 shown in FIG. 1, each of the flashing points 38a, 38bon the seal element 26 shown in FIG. 2 is positioned on a part of the surface 28 of the seal element 26 located away from contact with a sealed fluid 41 (seen in FIG. 3). Thus, and as seen in FIG. 3, when a surface 40 is positioned to extend across the mouth 12 of the groove 10 and to compress the seal element 26 into the groove 10, neither flashing point 38a, 38bis in contact with the sealed fluid 41. Accordingly, undue wear and failure of the seal element 26 is significantly reduced or prevented.

Preferably, the seal element 26 is molded with the flashing points 38a, 38boffset to the positions shown in shown in FIG. 2. The process for such molding is well known and further discussion is not necessary. Thus, in an unstressed state, the second arcual portion 32 and the flashing point 38bof the seal element 26 is complementarily received by the rounded surface 19, and the flashing point 38a is moved toward the mouth 12 of the groove 10, and the seal element 26 need not be toroidally rotated during installation for proper seating.

Preferably, the surface 28 of the seal element 26 also has first and second generally linear portions 42, 44 interposed between the first and second arcual portions 30, 32. More particularly, and as seen in FIG. 2, the first linear portion 42 extends between one end of the first arcual portion and a corresponding end of the second arcual portion, and is oriented generally parallel with respect to and contacts the first side wall 14. Similarly, the second linear portion 44 extends between the other end of the first arcual portion 30 and the other end of the second arcual portion 32 and is oriented generally parallel with respect to and contacts the base wall 18. Accordingly, the first and second arcual portions 30, 32 and the first and second linear portions 42, 44 combine to form the surface 28 of the seal element 26 in a substantially continuous and complete manner.

As seen in FIG. 2, the first arcual portion 30 may be subdivided to include first and second arcual subportions 46, 48. The first and second arcual sub-portions each have a mean radius $R_{11}$, $R_{12}$, respectively, substantially equal to the first mean radius $R_1$, and radial centers 50, 52, respectively. Preferably, the radial center 50 of the first arcual sub-portion 46 is offset from the first radial center 34 a relatively small distance as compared to the first mean radius $R_1$ and toward the mouth 12 of the groove 10, and the radial center 52 of the second arcual subportion 48 is offset from the first radial center 34 a relatively small distance as compared to the first mean radius $R_1$ and away from the mouth 12 of the groove 10. Thus, the first arcual sub-portion 46 protrudes through the mouth 12 of the groove 10 and the second arcual sub-portion 48 contacts the base wall 18 of the groove 10. As will be recognized, although the mean radii $R_{11}$ and $R_{12}$ are substantially equal to the first mean radius $R_1$, they are of necessity slightly smaller than the first mean radius $R_1$.

The subdivided first arcual portion 30 also has a generally linear portion 54 that extends between the ends of the first and second arcual sub-portions 46, 48 that are more distant from the second arcual portion 32. Preferably, the linear portion 54 extends a relatively small distance as compared to the first mean radius $R_1$. More preferably, the linear portion 54 extends a distance substantially equal to a distance between the radial centers 50, 52 of the first and second arcual sub-portions 46, 48. Also preferably, the linear portion 54 is oriented generally perpendicularly with respect to the base wall 18 of the groove 10 when the seal element 26 is positioned in the groove 10.

With the asymmetrical geometry of the seal element 26 of the present invention, the seal element 26 is prevented from rolling and twisting in the groove 10 during installation and operation. Accordingly, the seal element 26 remains properly seated in the groove 10 and does not have unwanted internal stress or twisting. Moreover, the offset parting points 38a, 38bof the seal element 26 of the present invention are not exposed to the sealed fluid 41, and resulting degradation and failure is avoided.

From the foregoing description, it can be seen that the present invention comprises a seal element for installation in an annual dove-tail groove. It will be recognized by those skilled in the art that changes may be made to the above-described embodiment of the invention without departing from the broad inventive concepts thereof. It is understood, therefore, that this invention is not limited to the particular embodiment disclosed, but is intended to cover all modifications which are within the spirit and scope of the appended claims.

We claim:

1. A seal element for installation in an annular groove having a mouth, first and second side walls, and a base wall axially extending between the side walls, the side walls extending toward each other as each side wall respectively approaches the mouth to form a dove-tail shape in toroidal cross-section, the first side wall meeting the base wall at a generally inwardly rounded surface, the seal element for sealing a sealed fluid and comprising a generally annularly shaped element formed of an elastomeric material and having an external seal surface including, in toroidal cross-section:

a first generally arcual portion having a first radius and a first radial center, the first radius being sized to allow the first arcual portion to contact the side walls and the base wall and to partially protrude through the mouth of the groove;

a second generally arcual portion having a second radius smaller than the first radius and a second radial center, the second radius being sized and the second radial center being offset from the first radial center to allow the second arcual portion to be complementarily received by a portion of the inwardly rounded surface of the groove; and a pair of mold flashing points generally oppositely situated on the external seal surface, each flashing point being positioned on a part of the external seal surface located away from contact with the sealed fluid.

2. The seal element as recited in claim 1 wherein one flashing point is positioned on each of the first and second arcual portions.

3. The seal element as recited in claim 2 wherein the flashing points and the first and second radial centers are positioned in a relatively straight line.

4. The seal element as recited in claim 1 wherein the external seal surface further includes in toroidal cross-section a first generally linear portion extending between one end of the first arcual portion and a corresponding end of the second arcual portion and a second generally linear portion extending between the other end of the first arcual portion and the other end of the second arcual portion.

5. The seal element as recited in claim 4 wherein the first linear portion is oriented generally parallel with respect to and contacts the first side wall, and wherein the second linear portion is oriented generally parallel with respect to and contacts the base wall.

6. The seal element as recited in claim 1 wherein the first arcual portion includes:

a first arcual sub-portion having a radius substantially equal to the first radius and a radial center offset from the first radial center a relatively small distance as compared to the first radius and toward the mouth of the groove, the first arcual sub-portion being sized to contact the side walls and to partially protrude through the mouth of the groove; and a second arcual sub-portion having a radius substantially equal to the first radius and a radial center offset from the first radial center a relatively small distance as compared to the first radius and away from the mouth of the groove, the second arcual sub-portion being sized to contact the base wall.

7. The seal element as recited in claim 6 wherein the first arcual portion further has a generally linear portion extending a relatively small distance as compared to the first radius and between an end of the first arcual sub-portion distal from the second arcual portion and a corresponding end of the second arcual sub-portion distal from the second arcual portion.

8. The seal element as recited in claim 7 wherein the linear portion extending between the first and second arcual sub-portions is oriented generally perpendicularly with respect to the base wall of the groove.

* * * * *